Figure 1:
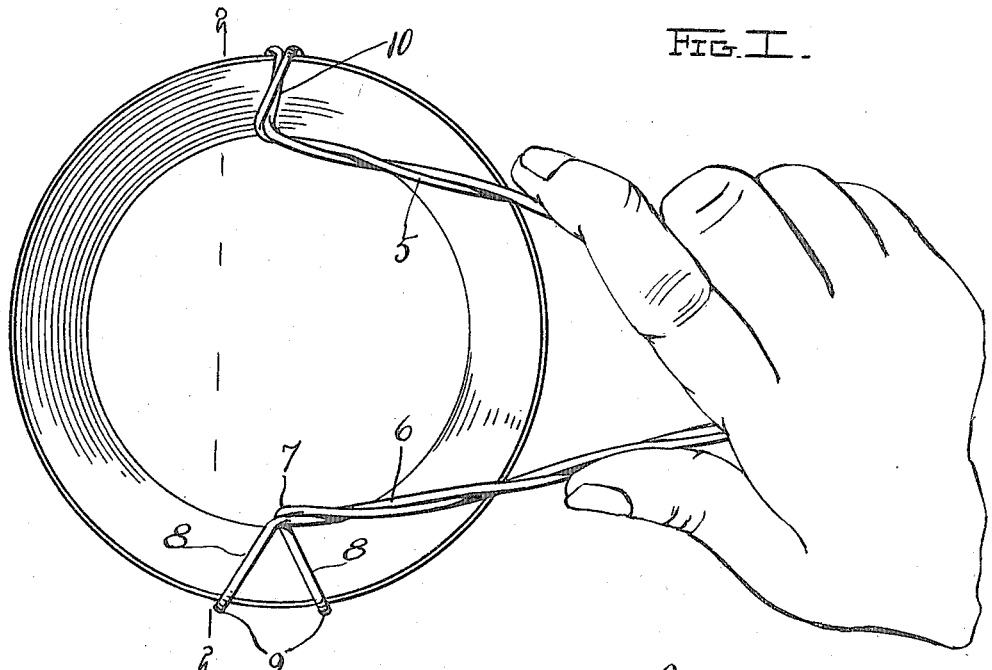

E. W. TUTHILL.
HOT PLATE OR DISH LIFTER.
APPLICATION FILED MAR. 28, 1916.

1,202,615.

Patented Oct. 24, 1916.

Witnesses.

Inventor
E. W. Tuthill.

By

Attorneys

UNITED STATES PATENT OFFICE.

EPHER W. TUTHILL, OF JAMESPORT, NEW YORK.

HOT PLATE OR DISH LIFTER.

1,202,615.　　　　　Specification of Letters Patent.　　Patented Oct. 24, 1916.

Application filed March 28, 1916. Serial No. 87,303.

*To all whom it may concern:*

Be it known that I, EPHER W. TUTHILL, a citizen of the United States, residing at Jamesport, in the county of Suffolk, State of New York, have invented certain new and useful Improvements in Hot Plate or Dish Lifters; and I do hereby declare the following to be a full, clear, and exact description of the invention, such as will enable others skilled in the art to which it appertains to make and use the same.

This invention relates to plate or dish lifters, and aims primarily to provide simple and efficient means for lifting and conveying hot plates from place to place without danger of burning the hands or dropping the plate.

A further object of the invention is to provide a dish lifter of such construction that a sure and positive grip upon the plate or dish may be had, and wherein the dish or plate may be quickly and easily released from the lifter.

A still further and particular object of the invention is to provide a device of this character which is of simple and inexpensive construction, which is extremely simple of operation which will prove thoroughly efficient in practice, and which is constructed to be everlasting in use.

With these objects in view, together with others which will appear as the description proceeds, the invention resides in the novel combination and arrangement of parts, all as will be described more fully hereinafter, illustrated in the drawings and particularly pointed out in the claim.

Figure 2:
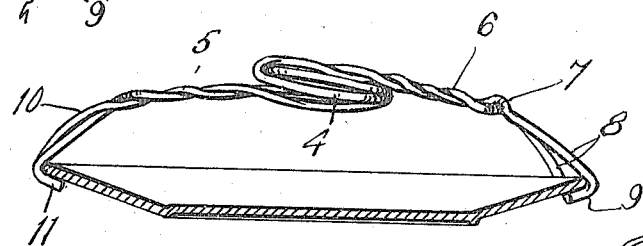
Figure 3:
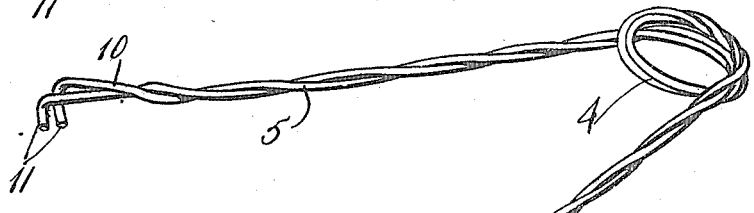

The invention will be best understood by reference to the accompanying drawings, wherein:

Figure 1, is a top plan view of the lifter and showing the same applied to a plate, Fig. 2, is a sectional view taken substantially on line 2—2 of Fig. 1, and Fig. 3, is a detail perspective view of the lifter removed from the plate.

Referring now more particularly to the drawings, the lifter is shown as being constructed of a pair of relatively heavy spring wires of equal length twisted together throughout their extent, the said twisted wire thus formed being coiled intermediate its ends as at 4 to provide divergent arms 5 and 6 respectively. The arms and coil portion thus formed constitute a handle by means of which the device may be readily grasped. The twisted wires constituting the arm 6 are separated at the free end of the latter and bent outwardly as at 7 to provide divergent projecting members 8, the said members being inclined slightly downwardly, and are turned inwardly at their extremities to provide hooks 9. The extremity of the opposite arm 5 is bent outwardly to provide a projecting portion 10, the latter being also inclined slightly downwardly, and being inturned at its extremity to provide a hook 11. The device thus constructed provides the normally outwardly extending arms 5 and 6 constituting the hand grip for the device. The lifter may be placed over a hot plate or pan with the hooks 9 and 11 at the extremities of the arms 5 and 6 lying beyond the periphery or edges of the dish. Inward pressure upon the arms 5 and 6 will then cause the hooks 9 and 11 to engage firmly with the edge of the dish to securely clamp the same, whereupon the dish may be lifted and carried to any desired place. By providing the spaced hooks 9 at one of the extremities of the spring arms, it is obvious that tilting of the plate held by the lifter will be prevented.

From the simple construction of the device it is apparent that the same may be manufactured at extremely low cost, and will prove practically everlasting in use.

While I have herein shown and described a particular or preferred embodiment of the invention, I wish it to be understood that I need not confine myself to all the precise details of construction herein set forth by way of illustration, as modification and variation may be made without departing from the spirit of the invention or exceeding the scope of the claim.

What is claimed is:

A plate lifter comprising a pair of spring wires twisted together throughout their extent and coiled intermediate their ends providing outwardly divergent arms, the wires constituting one of said arms being separated at the free end of the latter and bent outwardly to provide divergent clamp members, inturned hooks at the ends of said members, the extremity of the opposite arm being bent outwardly, and an inturned hook at the end of said arm, substantially as described.

In testimony whereof, I affix my signature, in the presence of two witnesses.

EPHER W. TUTHILL.

Witnesses:
 LAURA T. FREDERICK,
 CHAS. S. TUTHILL.

Copies of this patent may be obtained for five cents each, by addressing the "Commissioner of Patents, Washington, D. C."